Aug. 28, 1934.  L. L. RICHARDSON  1,971,578
HOSE COUPLING
Filed March 23, 1932
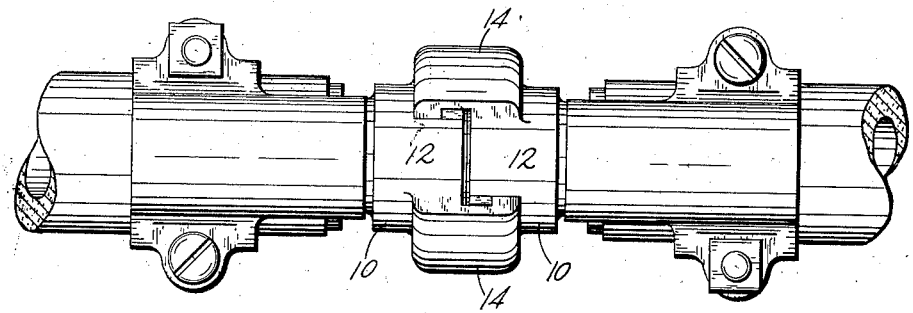
Fig.1
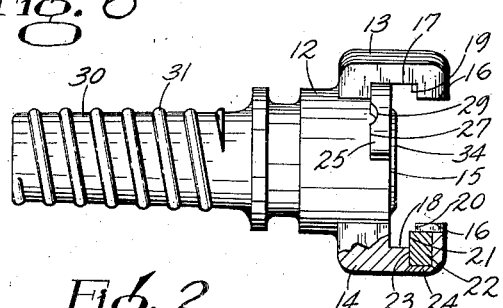
Fig. 6
Fig. 2
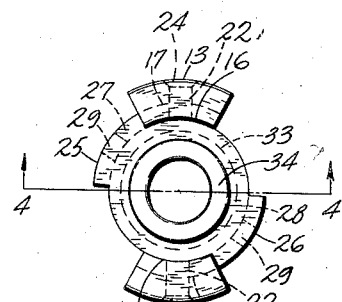
Fig. 3
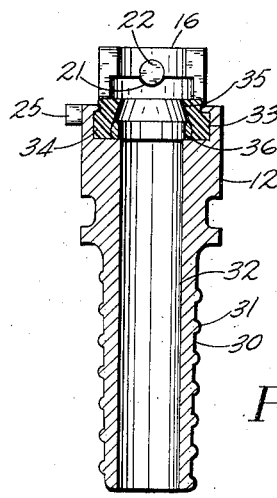
Fig. 4
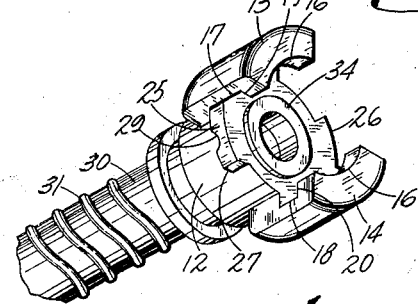
Fig. 5
LEO L. RICHARDSON
INVENTOR
BY John E. Reufer
ATTORNEY Patented Aug. 28, 1934

1,971,578

UNITED STATES PATENT OFFICE 1,971,578

HOSE COUPLING

Led L. Richardson, Cleveland, Ohio, assignor to The Cleveland Rock Drill Company, Cleveland, Ohio, a corporation of Ohio Application March 23, 1932, Serial No. 600,629

2 Claims. (Cl. 285—67)

This invention relates to hose coupling and is particularly directed to improvements in the structure of the companion flanges and locking members therefor.

One of the objects of the invention is to construct a coupling member so formed that a duplicate thereof may be employed to form a bi-part coupling assembly, facilitating thereby the production of a single member which may be interchangeably employed and connected to a similar member to form a coupling assembly.

Another object of this invention is to provide a coupling having the companion flanges thereof disposed in a plane normal to the tensional forces imposed thereon, thus preventing the transformation of these forces into a torque having the tendency to cause the disengagement of the coupling's members.

Another object of this invention is to construct a coupling in which liberal engaging surfaces are provided and in which the portion subjected to the most severe wear are formed of enlarged area, thus prolonging the life of the coupling and reducing the cost of operation.

Other objects and advantages more or less ancillary to the foregoing, and the manner in which the various objects are realized will become apparent from a more complete examination of this description, which considered in connection with the accompanying drawing, sets forth the preferred embodiment of the invention.

In the drawing:

Fig. 1 is an elevational view of the coupling assembly illustrating the two members in connected relation.

Fig. 2 is an elevational view of one of the members of the coupling, a portion thereof, being shown in section.

Fig. 3 is an elevational end view of the member illustrated in Fig. 2.

Fig. 4 is a sectional view taken on a plane indicated by the line 4—4 in Fig. 3.

Fig. 5 is a perspective view of one of the members of the coupling.

Fig. 6 is a sectional view of the packing used in connection with this invention.

Referring to the drawing, the coupling comprises two interlocking members 10 each of which is a replica of the other. The members 10 are formed with a cylindrical base portion 12 provided with oppositely disposed lugs 13 and 14 integrally formed therewith. These lugs are extended beyond the face 15 of the base 12, and are formed with arcuated walls and the end portions 16 of which are adapted to encompass the perimeter of the cylindrical base 12, of the co-operating member. Grooves 17 and 18, forming flanges 19 and 20, parallel with the face 15 or end wall of the base 12, are formed in the inner walls of the lugs. Intermediate the ends of the lugs 13 and 14 and extending within the grooves 17 and 18, there are hardened steel pins 22 arranged with respect to the flanges 19 and 20. The pins are to form a protruding semi-circular rib or tongue 21. The pins 22 may be secured within the lugs in any suitable manner which will facilitate their ready removal for purposes of repair or may be welded in place as at 24.

The base portion 12 is further provided with oppositely disposed segmental flanges or ledges 25 and 26. These ledges are concentric with the cylindrical base 12 and are somewhat narrower than the width of the grooves 17 and 18. The upper face of each of the flanges 25 and 26 are flush with the surface 15, and the length of these flanges is slightly less than that of the lugs 13 and 14 to permit the introduction of the lugs of a co-operating member 10 and afford, after these members have been rotated in opposite directions, the engagement of the flanges 20 and 26, 19 and 25 respectively. Intermediate the ends of the flanges 25 and 26 and in the lower faces 27 and 28 thereof, there are grooves or recesses 29 adapted to receive the tongues 21. These recesses are formed concentric with, and relatively larger than the tongues 21.

The base 12 is formed with a shank 30 formed upon the exterior therof with a helical rib 31 for engagement with an air hose which is clamped thereon in the conventional manner. The shank 30 is provided with a bore 32, which is terminated with an enlarged counterbore 33 formed within the base 12. Within the counterbore 33, there is disposed a packing 34, preferably made of resilient material such as rubber. The packing 34 is formed with a tapered aperture 35 within which there is pressed in the larger end thereof, a retainer or ring 36. This retainer is narrower than the depth of the counterbore 32 and is somewhat larger in diameter than the largest diameter of the packing tapered aperture 35 so as to effect a compression of the lower portion of the packing within the counterbore 33 and preventing thereby its accidental removal. The packing 34 is of sufficient height to protrude from the counterbore 33 above the surface 15, so that it may be unrestricted and free to partake the distortion effected by the compressive pressure imposed by the connection.

When using this coupling in connection with portable fluid actuated tools, it is the practice of the operator before connecting the hose to "blow the line" i. e. allow pressure fluid to flow through the hose and expel any foreign matter which may have collected therein. Heretofore during that operation, the packing would frequently be blown out of the coupling and a new packing member had to be introduced therein before the coupling could be used efficiently. By machining the internal diameter of the retainer 36 somewhat larger than the bore 31, a free passage of the fluid is obtained and the possibility of accidental removal of the packing is consequently avoided.

When it is desired to connect the two members 10, the lugs 13 and 14 of each member are positioned in telescope engagement with the cylindrical base 12 of the other member. The two members are forced together compressing the packings 34 until the flanges 25 and 26 are positioned to enter the grooves 17 and 18. The members 10 are then rotated until the ribs 21 engage the recesses 29. During this operation the packings 34 are highly compressed thereby effecting a fluid tight connection. The effort exerted by the compressed packings 34 will cause the ribs 22 to be retained within the grooves 29 and thus eliminate the accidental separation of the members.

In the present embodiment, the circumference of the face 15 of the coupling is divided in three relatively equal portions, the lugs 13 and 14 embodying substantially one third thereof; one third comprising the flanges 25 and 26 and the other third comprising the openings between the flanges 25 and 26 and the lugs 13 and 14, the latter providing for the introduction of the lugs upon the cylindrical body 12. The height of the compressible packing 34 is sufficient to effect a pressure between the lower faces 27 and 28 of the flanges 25 and 26, and the companion flanges 19 and 20 thus affording a dependable bearing of liberal engagement between the two parts equal to two thirds of the circumference of the face 15. Since the engaging surfaces and flanged portions of the two members are positioned in a plane normal to the axis of the coupling, the thrust or tensional forces will be most effectively resisted and the possibility of accidental disengagement which occurs when flanges formed with tapered or helical engagement are employed. As in this type of flanges the thrust or pressure is transmitted into a torque reaction which will unwind or cause the separation of the member through the coaction of the inclined planes.

The couplings can be disconnected by pushing the two members 10 against each other to further compress the packings 34, then rotating the members to disengage the ribs 21 from the grooves 29, and further rotating and separating the coupling.

Although the foregoing description is necessarily of a detailed character, in order to completely set forth the invention, it is to be understood that the specific terminology is not intended to be restrictive or confining and it is to be further understood that various rearrangements of parts and modification of structural detail may be resorted to without departing from the scope or spirit of the invention as herein claimed.

I claim:

1. A hose coupling comprising two complementary members, grooved lugs extending from an end of each member, and radially extending ledges adjacent the lugs, the upper wall of the groove of each lug and the lower wall of each ledge forming a bearing surface throughout their lengths for engagement with the respective adjoining lugs and ledges of the adjacent members when coupled together for eliminating any rocking movement between the members, said lugs and ledges each provided with means adapted to be brought into interlocking engagement when the bearing surfaces are brought into locking engagement to prevent relative rotation of the members.

2. A hose coupling comprising two complementary members, grooved lugs extending from an end of each member, and radially extending ledges adjacent the lugs, the upper wall of the groove of each lug and the lower wall of each ledge forming a bearing surface throughout their lengths for engagement with the respective adjoining lugs and ledges of the adjacent members when coupled together for eliminating any rocking movement between the members, said lugs each provided intermediate the length of the bearing surface thereof with a projecting pin or rib and said ledges each provided intermediate the length of the bearing surface with a recess adapted to receive a pin of the lug to prevent relative rotation of the members when the bearing surfaces are brought into locking engagement.

LED L. RICHARDSON.